(12) United States Patent
Lehmann

(10) Patent No.: US 10,479,011 B2
(45) Date of Patent: Nov. 19, 2019

(54) CABLING INTERFACE FOR A PRODUCTION MACHINE IN THE PLASTICS PROCESSING INDUSTRY AND METHOD FOR RETOOLING SUCH A PRODUCTION MACHINE

(71) Applicant: KISTLER HOLDING AG, Winterthur (CH)

(72) Inventor: Andri Lehmann, Aesch B. Neftenbach (CH)

(73) Assignee: Kistler Holding AG, Winterthur (CH)

( * ) Notice: Subject to any disclaimer, the term of this patent is extended or adjusted under 35 U.S.C. 154(b) by 354 days.

(21) Appl. No.: 15/234,388

(22) Filed: Aug. 11, 2016

(65) Prior Publication Data

US 2017/0050360 A1    Feb. 23, 2017

(30) Foreign Application Priority Data

Aug. 20, 2015  (EP) .................................... 15181828

(51) Int. Cl.
| | |
|---|---|
| *B29C 45/76* | (2006.01) |
| *H01R 27/02* | (2006.01) |
| *B29C 45/26* | (2006.01) |
| *H01R 13/46* | (2006.01) |
| *H01R 31/00* | (2006.01) |

(Continued)

(52) U.S. Cl.
CPC .............. *B29C 45/76* (2013.01); *B29C 45/26* (2013.01); *B29C 45/77* (2013.01); *H01R 4/021* (2013.01); *H01R 13/465* (2013.01); *H01R 27/02* (2013.01); *H01R 31/005* (2013.01); *B29C 2945/76006* (2013.01); *B29C 2945/76257* (2013.01); *B29L 2031/3462* (2013.01)

(58) Field of Classification Search
CPC ......... B29C 45/76; B29C 45/77; B29C 45/26; H01R 27/02; H01R 27/021
See application file for complete search history.

(56) References Cited

U.S. PATENT DOCUMENTS 5,553,269 A * 9/1996 Nunes .................. G05B 19/042
                                                    340/3.2
6,212,963 B1   4/2001 Bader et al.
(Continued)

FOREIGN PATENT DOCUMENTS

| CN | 201181582 | 1/2009 |
|---|---|---|
| DE | 203 15 837 | 4/2005 |
| WO | WO 2007/016799 | 2/2007 |

OTHER PUBLICATIONS

EP Search Report, dated Mar. 21, 2016.
(Continued)

*Primary Examiner* — Nahida Sultana
(74) *Attorney, Agent, or Firm* — Dority & Manning, P.A.

(57) ABSTRACT

A production machine in the plastics processing industry includes multiple cavities and multiple piezoelectric pressure transducers. At least one piezoelectric pressure transducer is arranged at each cavity and captures an internal tool pressure inside the cavity and returns an electrical charge signal for each internal tool pressure detected. A cabling interface conducts the electrical charge signal away from piezoelectric pressure transducer via an inner cable. Each of the inner cables can be connected electrically to the cabling interface via at least two different connection standards.

12 Claims, 7 Drawing Sheets

(51) Int. Cl.
    *H01R 4/02*     (2006.01)
    *B29C 45/77*     (2006.01)
    *B29L 31/34*     (2006.01)

(56) References Cited

U.S. PATENT DOCUMENTS

| | | | |
|---|---|---|---|
| 7,880,632 B2 * | 2/2011 | Waser | G01D 21/02 |
| | | | 340/680 |
| 8,896,150 B1 * | 11/2014 | Shammoh | H01R 13/70 |
| | | | 307/31 |
| 2005/0083640 A1 | 4/2005 | Reker | |
| 2007/0167039 A1 | 7/2007 | Wu | |
| 2008/0204265 A1 | 8/2008 | Waser et al. | |
| 2008/0254684 A1 | 10/2008 | Tracy et al. | |
| 2012/0147574 A1 | 6/2012 | Yang et al. | |
| 2015/0336311 A1 * | 11/2015 | Newman | B29C 45/14 |
| | | | 264/279.1 |
| 2018/0359873 A1 * | 12/2018 | Shemirani | H01R 24/62 |
| 2019/0008575 A1 * | 1/2019 | Holub | H01R 27/02 |

OTHER PUBLICATIONS

Kistler Group, Multi-Channel Connector for Mold Cavity Pressure Measurement, pp. 1-3.

Chinese Office Action and English Translation thereof, CN Application No. 2016106852606, dated May 7, 2019, 14 pages.

* cited by examiner

CABLING INTERFACE FOR A PRODUCTION MACHINE IN THE PLASTICS PROCESSING INDUSTRY AND METHOD FOR RETOOLING SUCH A PRODUCTION MACHINE

BACKGROUND

The invention relates to a cabling interface for a production machine in the plastics processing industry, a method for retooling such a production machine with the inventive cabling interface, a retooled a production machine, and to a method for maintaining a production machine that has been retooled with the inventive cabling interface.

U.S. Pat. No. 6,212,963, which is hereby incorporated herein by this reference for all purposes, describes a known cabling interface for a production machine in the plastics processing industry. In the production machine, a relatively large number of workpieces are produced simultaneously and with high precision in a tool with a multi-cavity injection mold. In order to keep the reject rate to a defined level, mass production processes are monitored by a plurality of piezoelectric pressure transducers. A piezoelectric pressure transducer is arranged in each cavity of the multi-cavity injection mold. The piezoelectric pressure transducer dynamically captures a progression of a pressure in the cavity in the interior of a tool and accordingly generates a highly sensitive electrical charge signal for each internal tool pressure captured. The progression of the internal tool pressure is captured in a range from 0 to 2000 bar. A sensitivity of the pressure detection is in the range from 1 to 100 pico coulombs per bar (pC/bar). A frequency of the dynamic detection of the pressure progression is in the range of a few kHz, which means that the pressure is being detected a few thousand times during each second. An operating temperature is in the range from 0° C. to 200° C. The electrical charge signals are conducted away via cables to an electrical amplifier.

However, the tool with the multi-cavity injection mold is of complex construction and a length of the cable inside the tool is therefore cable-specific. In order to be able to route the cables inside the tool simply, cables that are not electromagnetically shielded are used, and these can be cut to length on site. The electrical charge signals also do not need to be shielded by separate means from electromagnetic and electrical interference because this is assured by a housing of the tools. The unshielded cables are thus inner cables. For this reason, the tool is equipped with the cabling interface, to accommodate the inner cables individually on an inner side of the tool and to transfer the electrical charge signals of each installed inner cable to an electromagnetically shielded outer cable on an outer side of the tool. The outer cable conducts the electrical charge signals away from the tool and on to the electrical amplifier.

However, manufacturers of production machines in the plastics processing industry have identified a need for a cabling interface that can accommodate the varied technical research and industrial needs of the customers for such production machines.

For example, U.S. Pat. No. 7,880,632, which is hereby incorporated herein by this reference for all purposes, describes a further known cabling interface for a production machine in the plastics processing industry. In the production machine, multiple measurement signals of different types are conducted away via multiple inner cables. The cabling interface includes a signal converter and an output interface. The signal converter converts the measurement signals of different types into measurement signals of the same type. The measurement signals of different types are electrical charge signals from piezoelectric pressure transducers and electrical thermo-electric voltages from thermocouples. The output interface conducts the measurement signals of the same type away to a single outer cable located outside the production machine and connected to an evaluation unit located outside the production machine. The outer cable is electromagnetically shielded. The outer cable is connected to the output interface in such manner that it can be electrically and mechanically disconnected from the output interface.

A known cabling interface of such kind for a production machine in the plastics processing industry is marketed commercially by the Kistler Group of both Amherst N.Y. and Novi Mich., with type designation 1710B, and details are provided in a datasheet 960-112d-02.15. At least one piezoelectric pressure transducer per cavity conducts electrical charge signals away to the cabling interface via an inner cable. Up to eight inner cables can be connected electrically to the inner side of the cabling interface, which is the side of the cabling interface that is disposed inside the tool. The electrical charge signals are transferred from inside the tool via the inner side of the cabling interface to the side of the cabling interface that is disposed on the outer side of the tool. An outer cable that is connected to the outer side of the cabling interface so as to be electrically and mechanically detachable thereto, conducts the electrical charge signals away to an evaluation unit located outside the tool. The outer cable is electromagnetically shielded.

A very similar known cabling interface for a production machine in the plastics processing industry is marketed commercially with type designations PZ-4 and PZ-8 by RJG Inc. of Traverse City, Mich. The external dimensions for installation in production machines of types 1710B from the Kistler Group and the PZ-4 and PZ-8 from RJG Inc, are largely identical.

One of the principal objects of the present invention is to adapt a known cabling interface for a production machine of the plastics processing industry so that it can accommodate the varied technical research and industrial needs of the customers for such production machines.

BRIEF SUMMARY OF THE INVENTION

The invention relates to a cabling interface for a production machine in the plastics processing industry, which production machine includes multiple cavities and multiple piezoelectric pressure transducers. Arranged at each of the machine's cavities is at least one of the multiple piezoelectric pressure transducers, and that one piezoelectric pressure transducer captures an internal tool pressure inside that cavity and returns an electrical charge signal for each internal tool pressure detected. An inner cable is typically integrally connected to that one piezoelectric pressure transducer and configured to transmit the electrical charge signal from the respective piezoelectric pressure transducer to the cabling interface of the production machine. Moreover, that inner cable is fitted for being connected to the cabling interface via a particular one of the electrical connection standards. The cabling interface is provided with a plurality of inner sockets, and a respective one of the inner sockets is assigned to a respective one of the inner cables and associated piezoelectric pressure transducers. The cabling interface is provided with a plurality of outer sockets, and a respective one of the outer sockets is assigned to and electrically connected with a respective one of the inner sockets so that each inner socket is paired with a respective outer socket. The cabling interface receives the electrical charge signal from the respective piezoelectric pressure transducer and transmits the electrical charge signal to an outer cable that carries the electrical charge signal to an evaluation unit via an outer cable, which itself is configured with a particular one of the electrical connection standards. In accordance with the present invention, each of the inner sockets of the cabling interface is provided with at least two different connection ports, and each of these two connection ports is configured with a different one of the available electrical connection standards. Moreover, each of the two or more connection ports at each inner socket are electrically connected together in a parallel circuit relationship so that the same electrical signal is carried by each of the two or more connection ports at each inner socket. Additionally, at least one outer socket is paired with and electrically connected together in a parallel circuit relationship to at least one respective inner socket so that the same electrical signal is carried by each of the two or more ports at each inner socket and at each paired outer socket.

In this way, electrical charge signals can be conducted away to an evaluation unit via the cabling interface even if the inner cables of the piezoelectric pressure transducers that return the electrical charge signals have different connection standards. This enables flexible maintenance of the production machine. If an installed piezoelectric pressure transducer is removed, it can be replaced with any piezoelectric pressure transducer that is currently available, even if the new transducer has a different connection standard, thereby saving costs and time. There also no longer is any necessity to use piezoelectric pressure transducers with a particular connection standard. Accordingly, piezoelectric pressure transducers with the best price-performance ratio can be used.

The invention also relates to a method for retooling a production machine of the plastics processing industry described above. The method involves removing the existing cabling interface from the production machine. Then a cabling interface is provided that may be connected electrically to the machine's inner cables via at least two different connection standards. This cabling interface is then installed in the production machine and connected electrically to the machine's inner cables.

In this way, an existing cabling interface is replaced with a cabling interface having multiple different connection standards. This enables flexible retrofitting of the production machine with piezoelectric pressure transducers having different connection standards than the connection standards of the originally installed piezoelectric pressure transducers. The cabling interface also permits a new evaluation unit with a new connection standard to be connected electrically to the piezoelectric pressure transducers currently installed in the machine in which the inner cables have a different particular connection standard than the new evaluation unit. In this way, a production machine may be retrofitted with a new evaluation unit offering the best price-performance ratio.

BRIEF DESCRIPTION OF THE DRAWINGS

In the following section, the invention will be explained in greater detail using the drawing figures in which.

DETAILED DESCRIPTION OF EXEMPLARY EMBODIMENTS OF THE INVENTION

Figure 1:
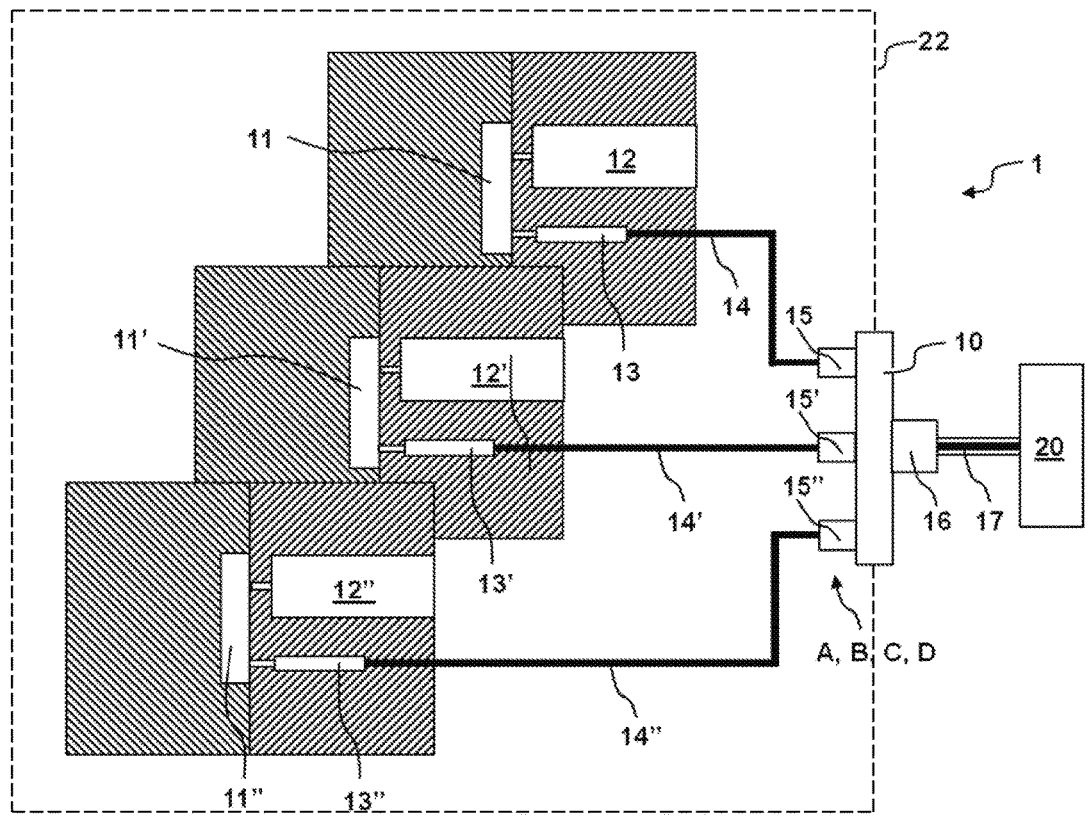
FIG. 1 is a schematic representation of a production machine, partially in cross-section, of the plastics processing industry with a cabling interface according to an embodiment of the invention.
Figure 2:
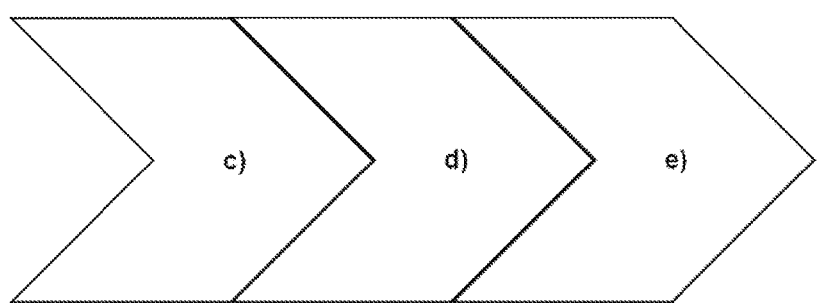
FIG. 2 is a flowchart schematically representing the steps in a method for retooling a production machine of the plastics processing industry.

FIG. 1 shows a production machine 1 of the plastics processing industry having a cabling interface 10 according to the invention and an evaluation unit 20 connected electrically and mechanically to the cabling interface 10. FIG. 2 shows a flowchart with steps c), d), e) of a method for retooling such a production machine 1 of the plastics processing Industry. FIGS. 3 to 14 show several embodiments of the cabling interface 10. In FIGS. 3 to 6, each of the embodiments of the cabling interface 10 is designed for two different connection standards, which are respectively designated A or B. In FIGS. 7 to 14, each of the embodiments of the cabling interface 10 is designed for three different connection standards, which are respectively designated A or B or C or alternatively A or B or D.

Production machine 1 of the plastics processing industry according to FIG. 1 includes in its body a tool with a multi-cavity injection mold with multiple cavities 11, 11', 11". A respective runner 12, 12', 12" is provided for each respective cavity 11, 11', 11". A respective piezoelectric pressure transducer 13, 13', 13" is arranged at each respective cavity 11, 11', 11". The crystallographic orientation of each of the respective piezoelectric pressure transducers 13, 13', 13" is such that a pressure acting on it produces electrical polarisation charges. The electrical polarisation charges are proportional to the magnitude of the internal tool pressure prevailing inside the respective cavity 11, 11', 11" and are tapped via electrodes in any conventional manner. Piezoelectric pressure transducers 13, 13', 13" dynamically capture a progression of the internal tool pressure in cavities 11, 11', 11". The production machine 1 also includes a plurality of cables 14, 14', 14" that are disposed within the machine 1, and a respective one of the cables 14, 14', 14" is assigned to and electrically connected to a respective one of the respective piezoelectric pressure transducers 13, 13', 13". Each respective inner cable 14, 14', 14" conducts from the respective piezoelectric pressure transducer 13, 13', 13" to a cabling interface 10, an electrical charge signal for a captured internal tool pressure in a respective cavity 11, 11', 11". Each of the piezoelectric pressure transducers 13, 13', 13" desirably is constructed integrally with a respective one of the inner cables 14, 14, 14".

With the knowledge presented in the present invention, the multi-cavity injection mold may be constructed with more than the three cavities represented in FIG. 1. For example, the production machine 1 may include as many as 50 cavities. Correspondingly more than three inner cables 14, 14', 14" also may be provided to conduct electrical charge signals away from the multiple piezoelectric pressure transducers 13, 13', 13" to the cabling interface 10. In just the exemplary embodiments of FIGS. 3 to 14 for example, anywhere from four to eight inner cables 14-14""' may be provided to conduct electrical charge signals to the cabling interface 10. Each respective one of the inner cables 14, 14', 14" has a respective electrical conductor for conducting the electrical charge signals carried by the respective inner cable. Moreover, each respective one of the inner cables 14, 14', 14" desirably may include a respective means for shielding the electrical charge signals from electromagnetic and electrical interference.

According to FIG. 1, the cabling interface 10 of the present invention desirably includes a frame that defines an inner side and an outer side disposed opposed to and facing away from the inner side of the cabling interface 10. Each respective one of the inner cables 14, 14', 14" is connected electrically to the cabling interface 10 via a respective one of a plurality of inner sockets 15, 15', 15" that are carried on the inner side of the frame of the cabling interface 10. The production machine 1 desirably can include a tool housing, which is shown schematically by the dashed line square that is designated by the numeral 22 in FIG. 1, and the tool housing 22 can provide electrical shielding to the inner cables 14, 14', 14" and integrally connected piezoelectric pressure transducers 13, 13', 13". The tool housing 22 desirably can be electrically connected to the cabling interface 10 so that the inner side of the cabling interface 10 faces inside the production machine 1 while the outer side of the cabling interface 10 is exposed outside of the production machine 1 for connection to an evaluation unit 20 for example.

A respective one of the plurality of inner sockets 15, 15', 15" is arranged on a tool inner side of the cabling interface 10. However, as explained more fully below, in accordance with the present invention, each of the inner sockets 15, 15', 15" depicted schematically in FIG. 1 is provided with and includes at least two different connection ports, and each of these two connection ports is configured with a different one of the available electrical connection standards such as the electrical connection standards designated A, B, C, D, etc, and described more fully below. Moreover, once possessed with the knowledge of the present invention, a person skilled in the art is able to use other connection standards not described in detail herein.

Figure 3:
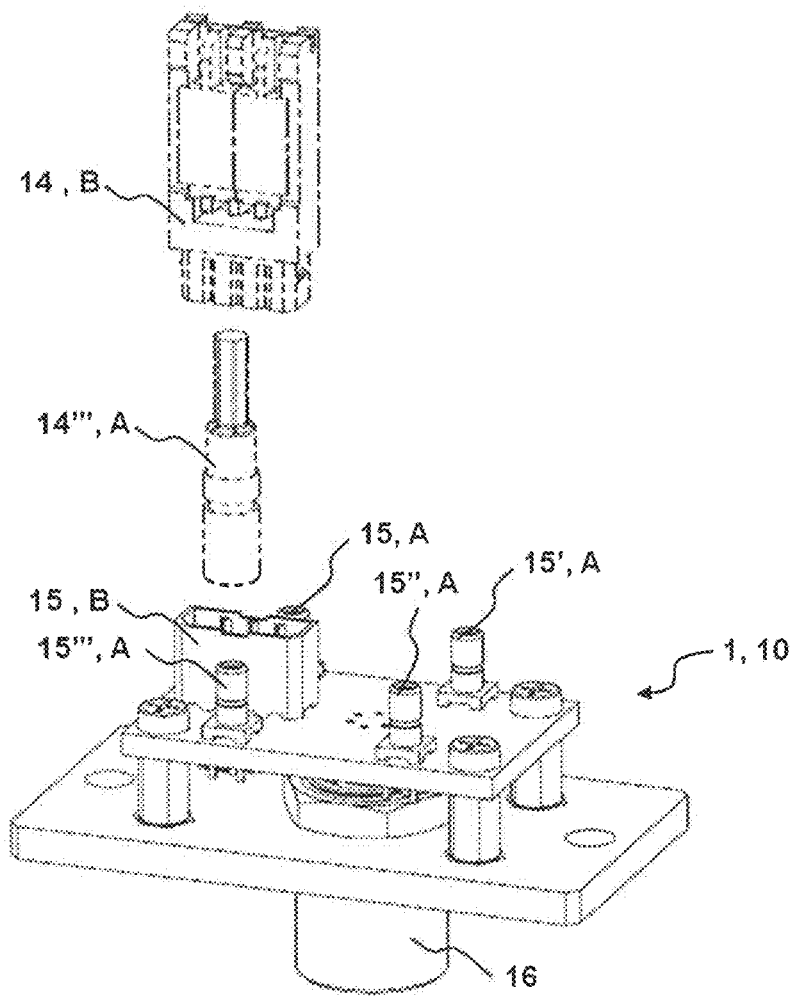
FIG. 3 is a perspective view of a first embodiment of a cabling interface according to the invention with two different connection standards.
Figure 4:
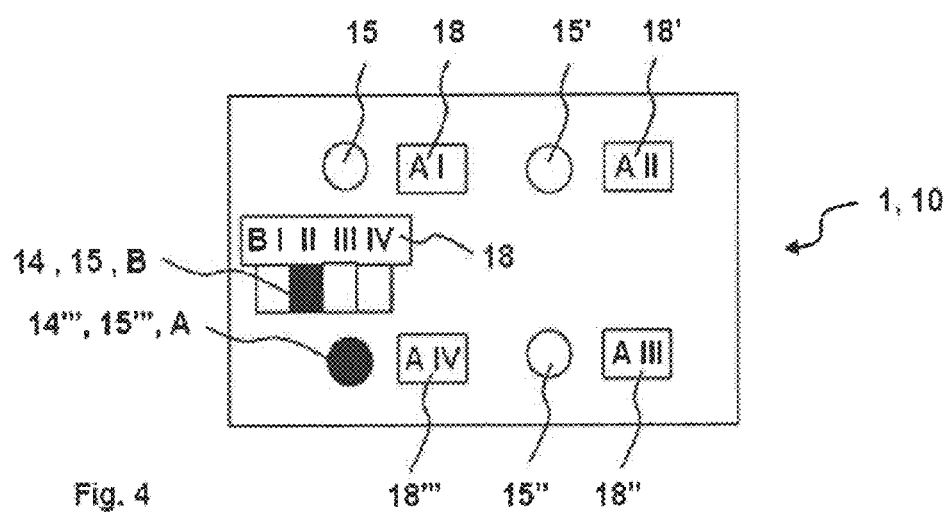
FIG. 4 is a plan view of the first embodiment of a cabling interface according to FIG. 3.

A respective one of the plurality inner cables 14, 14', 14" is adapted to a respective one of the available different connection standards, each respective different connection standard described more fully below being designated by A or B or C or D. However, while each of the inner sockets 15, 15', 15" of the cabling interface 10 is assigned to a respective one of the plurality inner cables 14, 14', 14", instead of each of the inner sockets 15, 15', 15" being fixed with a single connection port according to only one of the possible available different electrical connection standards A, B, C, D, etc., in accordance with the present invention, each of the inner sockets 15, 15', 15" is provided with and includes at least two different connection ports, and each of these two connection ports is configured with a different one of the available electrical connection standards A, B, C, D, etc. For example, as shown in FIGS. 3 and 4, inner socket 15 includes two different connection ports 15, A and 15, B, and each of these two connection ports (15, A, 15, B) is configured with a different one of the available electrical connection standards. In this example, one of the connection ports 15, A of this inner socket 15 is configured with the A electrical connection standard, and the other one of the connection ports 15, B is configured with the B electrical connection standard.

A first connection standard A relates to a manually detachable electrical connection of a coaxial cable 14 to a mating coaxial port of a paired inner socket 15 in the cabling interface 10. The coaxial cable and the coaxial port of the inner socket shield the electrical charge signal electromagnetically. In order to create an electrical connection, the coaxial cable is plugged into the coaxial port of the inner socket and engaged in place. Correct engagement is confirmed audibly. The electrical connection between the coaxial cable and the coaxial port of the inner socket is reversibly detachable. In FIGS. 3 to 14, the coaxial cable is represented by a respective inner cable 14', 14'", 14""' with the A designation, and the corresponding coaxial connection port 15', 15'", 15""' of the respective inner socket is likewise represented with the A designation. Such a coaxial cable adapted to the first connection standard A is available commercially with type designation 1943C from the Kistler Group, and details are provided in datasheet 1631C-000-346d-12.13.

A second connection standard B relates to a manually detachable electrical connection of a pierce contact cable plug with a mating connection port in the inner socket 15 of the cabling interface 10. The electrical charge signal is carried in a single-wire cable which is not shielded electromagnetically. The single-wire cable includes a sheath with electrical insulation. In order to be able to route the single-wire cable inside the tool easily, the single-wire cable is cut to size on site and introduced into the pierce contact cable plug with an end thereof that has not been stripped. The pierce contact cable plug has a housing and pierce contacts. When the pierce contacts are actuated, the electrical insulation on the introduced cable end is pierced, and the cable end is connected mechanically and electrically to the housing of the plug. Actuation of the pierce contacts and/or the mechanical engagement of said pierce contacts are/is confirmed audibly. The electrical connection between the respective pierce contact cable plug and the respective connection port in the inner socket 15 of the cabling interface 10 is reversibly detachable. In FIGS. 3 to 14, the single-wire cable with pierce contact cable plug is represented by inner cable 14', 14'"", 14""' with the B designation, and the corresponding mating port 15', 15"", 15""' of the respective socket is represented with the B designation. Such a pierce contact cable plug cable adapted to the second connection standard B is available commercially from Phoenix Contact of Middletown, Pa. in the product family PTPM 0,4/..-P.

A third connection standard C relates to an electrical connection between a single-wire cable and an insulation displacement contact (IDC) socket in the cabling interface 10. The electrical charge signal is carried in a cable that encases a single electrically conducting wire cable within a sheath of insulation. This single-wire cable is not shielded electromagnetically. For easy insertion in the tool, the single-wire cable is cut to size on site and introduced into the IDC socket with an end thereof that has not been stripped. An installation aid in the form of a specially shaped cutting blade is temporarily inserted and into the DC socket and removes a section of the insulation to expose the wire. The installation aid is removed from the DC socket, and an electrical connection is created when the cable end that has been introduced is clamped within the IDC socket. This type of electrical connection can be reversibly detached only a few times. In FIGS. 7, 8, 13 and 14, the stripped single-wire cable is represented by the inner cable 14', 14'''', 14''''' with the C designation, and the mating connection port 15', 15'''', 15''''' of the respective inner socket is represented with the C designation. Such a stripped single-wire cable adapted to the third connection standard C is available commercially from the Kistler Group with type designations 1666A, 1674AZsp and 1900A1. Such an inner socket with a connection port adapted to the third connection standard C is available commercially from the Kistler Group with type designations 1712A0 and 1714A0, details are provided in datasheet 960-112d-02.15.

A fourth connection standard D relates to a detachable electrical connection between an insulation displacement contact plug and a connection port of a socket in the cabling interface 10. The electrical charge signal is carried in a cable that encases a single electrically conducting wire cable within a sheath of insulation. This single-wire cable is not shielded electromagnetically. In order to be able to route the single-wire cable inside the tool easily, the single-wire cable is cut to size on site and introduced into the IDC cable plug with a cable end thereof that has not been stripped. The IDC cable plug includes a housing with a crimping clamp. Upon actuation, the crimping clamp cuts through the electrical insulation of the inserted single-wire cable end and strips away the insulation from the cable wire, and the cable wire is also slightly nicked and connected mechanically and electrically with the housing. Actuation of the crimping clamp is confirmed audibly. The electrical connection between the insulation displacement contact cable plug and the corresponding port of the socket of the cabling interface 10 is reversibly detachable. In FIGS. 9 to 12, the single-wire cable with IDC cable plug is represented by the inner cable 14''' with the D designation, and the mating port 15''' of the respective inner socket is represented with the D designation. Such a crimped IDC cable plug adapted to the fourth connection standard D is available commercially from Phoenix Contact in an item family designated CIOC-M.

The cabling interface 10 is configured for multiple electrical connections, and each respective electrical connection is schematically designated by one of the Roman numerals I through VIII. Each of the respective electrical connections I-VIII is intended to be made with a respective one of the corresponding multiple inner cables 14-14'''''. Accordingly, a respective one of the multiple inner cables 14-14''''', A, B, C or D forms a respective electrical connection I-VIII with a respective one of the connection ports 15-15''''', A, B, C or D of the inner sockets 15-15''''' of the cabling interface 10. In FIGS. 4, 6, 8, 10, 12 and 14, each of the respective electrical connection ports 15-15''''', A, B, C or D of the inner sockets 15-15''''' that is connected electrically to a respective inner cable 14-14''''' is designated by being colored in solid black. Each of the electrical connection ports 15-15''''', A, B, C or D of the inner sockets 15-15''''' is furnished with an electrical conductor to conduct the electrical charge signals away from a respective one of the multiple inner cables 14-14'''''. For each one of the electrical connections I-VIII, there is provided in accordance with the present invention a respective electrical connection port 15-15''''', A, B, C or D of the inner sockets 15-15''''', and each of these respective inner sockets includes at least two connection ports that are configured according to different connection standards, which for example may be selected from the group consisting of a coaxial socket type connection A, a pierce contact cable socket type connection B, a first (stripped) insulation displacement contact (IDC) type connection C, and a second (crimped) insulation displacement contact type connection D, as well as other electrical connection standards that are not described herein.

In the embodiments according to FIGS. 3 and 4, the cabling interface 10 is designed for up to four electrical connections I-IV, wherein each electrical connection I-IV may be implemented in two different connection standards, namely a socket having both a connection port with a coaxial type connection standard A and a connection port with a pierce contact cable type connection standard B. Thus, for example a first inner cable 14 can make a first electrical connection I with a first socket 15 that includes a first connection port 15A of the A connection standard and a second connection port 15, B of the B connection standard, which is electrically connected to the first connection port 15, A in a parallel relationship. Regardless whether the connection standard of the first inner cable 14 is of the A type or B type, a connection can be made to the first socket 15 of the cabling interface 10 of the present invention. In similar fashion, a second inner cable 14 can make a second electrical connection II with a first socket 15 that includes a connection port 15, A of the A connection standard and a second connection port 15, B of the B connection standard, which is electrically connected to the first connection port 15, A in a parallel relationship. Regardless whether the connection standard of the second inner cable 14 is of the A type or B type, a connection can be made to the second socket of the cabling interface 10 of the present invention. Because embodiments according to FIGS. 3 and 4 have up to four electrical connections I-IV, the cabling interface 10 of the present invention is similarly configured to accommodate a third inner cable 14 and a fourth inner cable 14.

Figure 5:
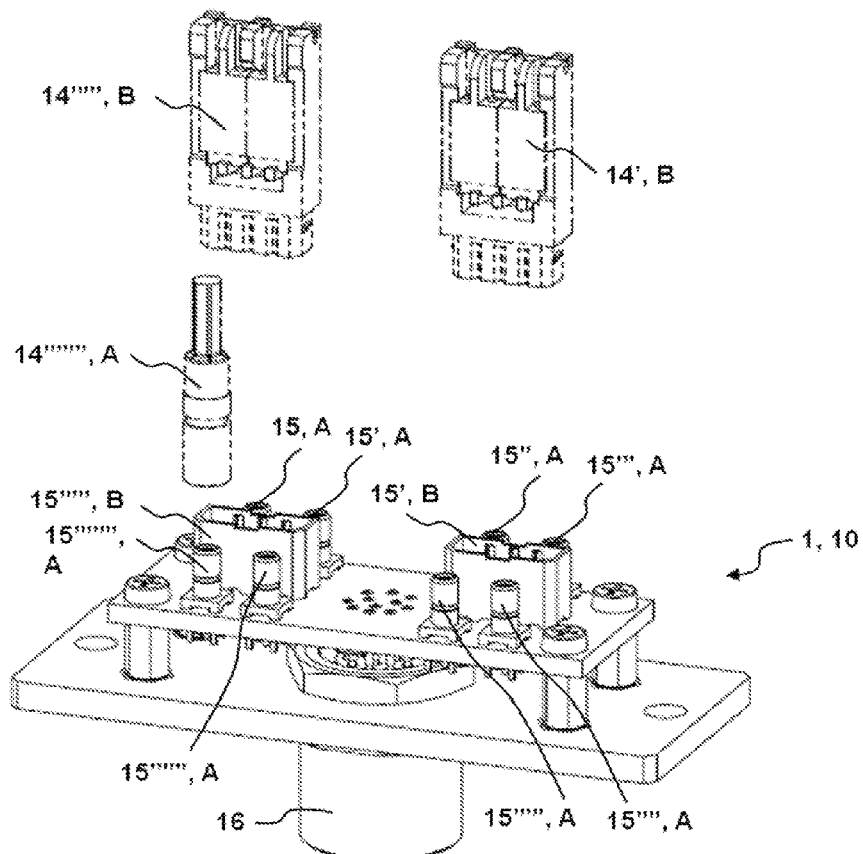
FIG. 5 is a perspective view of a second embodiment of a cabling interface according to the invention with two different connection standards.
Figure 6:
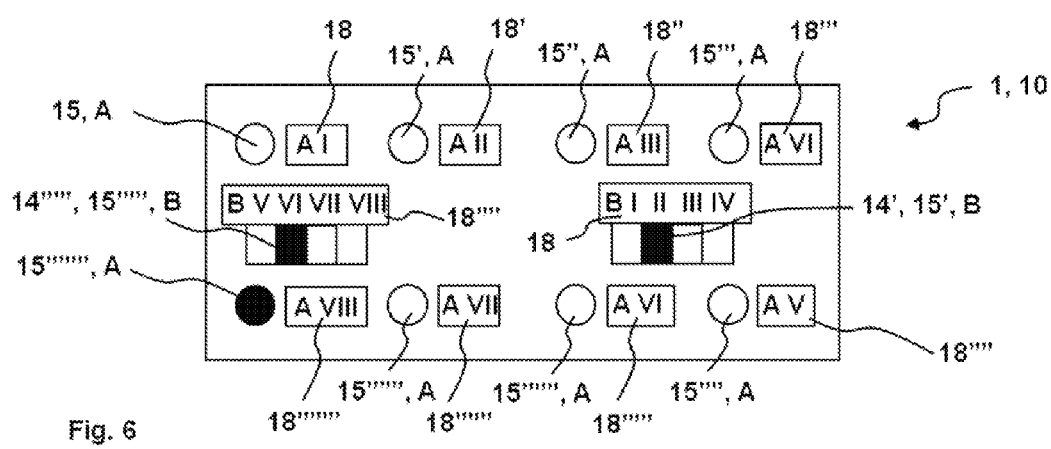
FIG. 6 is a plan view of the second embodiment of a cabling interface according to FIG. 5.

In the embodiments of FIGS. 5 and 6, the cabling interface 10 is designed for up to eight electrical connections I-VIII, wherein each electrical connection I-VIII may be implemented in two different connection standards A, B.

Figure 7:
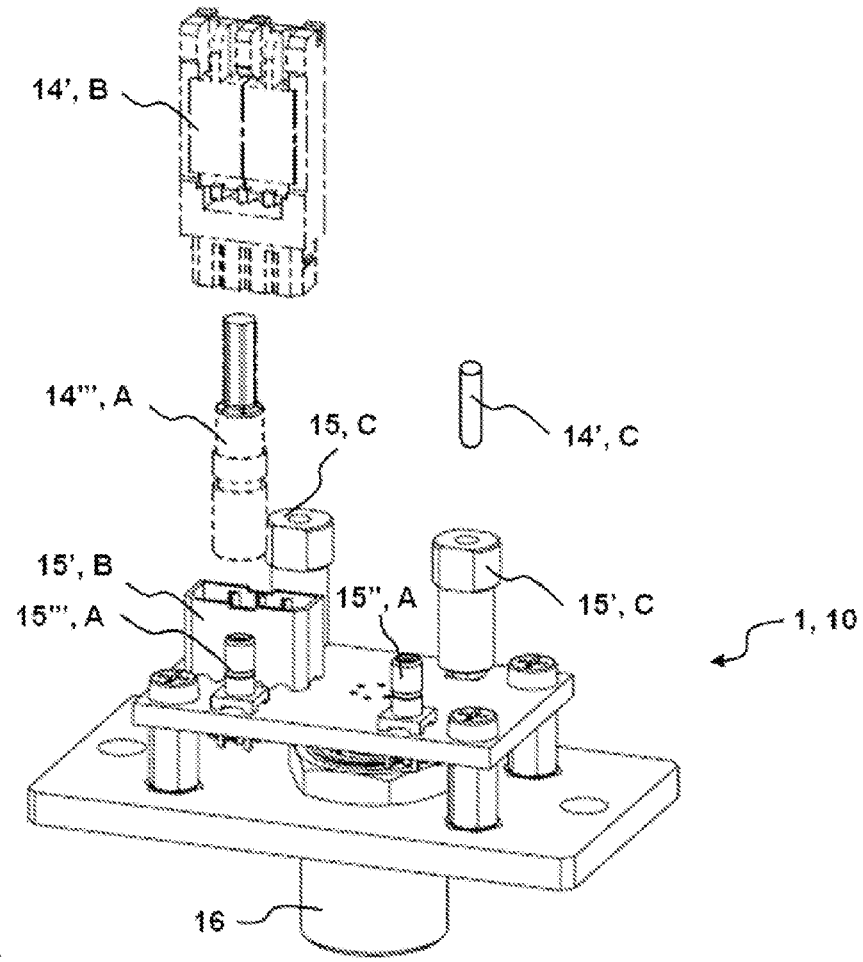
FIG. 7 is a perspective view of a third embodiment of a cabling interface according to the invention with three different connection standards.
Figure 8:
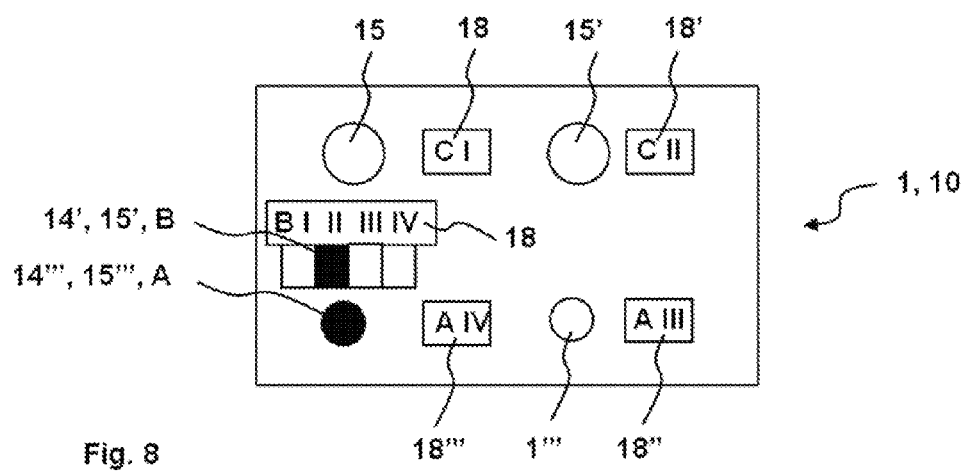
FIG. 8 is a plan view of the third embodiment of a cabling interface according to FIG. 7.

In the embodiments according to FIGS. 7 and 8, the cabling interface 10 is designed for up to four electrical connections I-IV, wherein each electrical connection I-IV may be implemented in two different connection standards, namely a pierce contact cable socket type connection standard B and either a coaxial socket type connection standard A or a first insulation displacement contact (IDC) socket type connection standard C.

Figure 9:
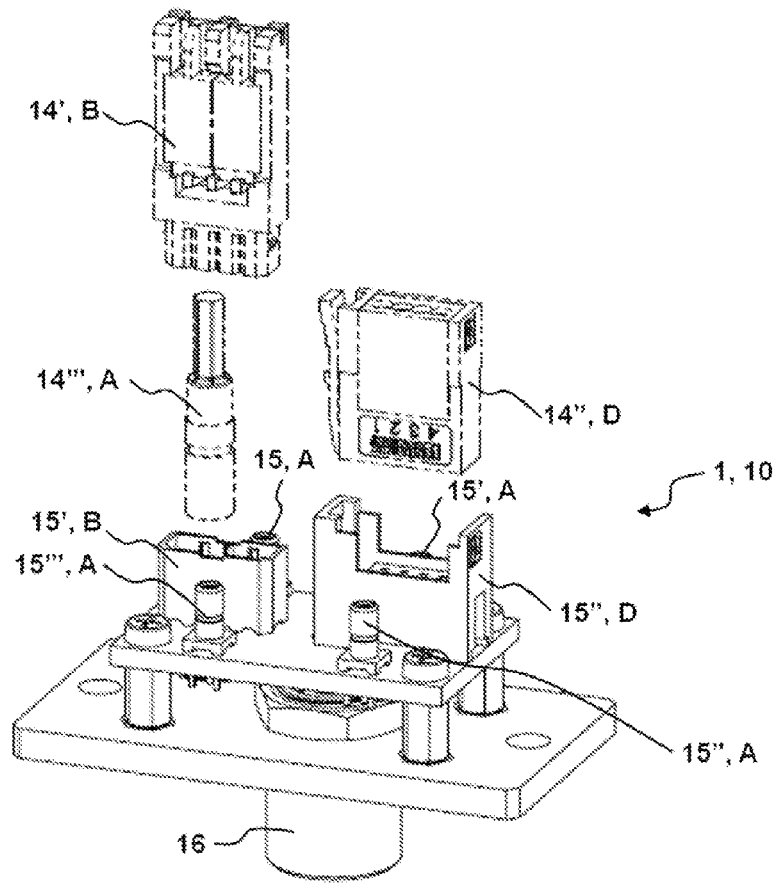
FIG. 9 is a perspective view of a fourth embodiment of a cabling interface according to the invention with three different connection standards.
Figure 10:
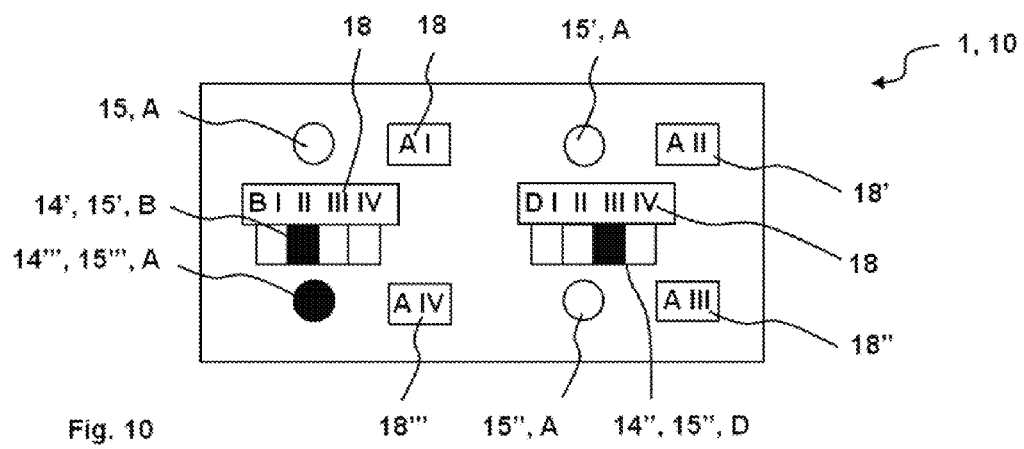
FIG. 10 is a plan view of the fourth embodiment of a cabling interface according to FIG. 9.

In the embodiments of FIGS. 9 and 10, the cabling interface 10 is designed for up to four electrical connections I-IV, wherein each electrical connection I-IV may be implemented in three different connection standards, namely a coaxial socket type connection standard A, a pierce contact cable socket type connection standard B, and a second insulation displacement contact standard D. With the knowledge presented in the present disclosure, a person skilled in the art is also able to provide each of the inner sockets with more than three connection ports having different connection standards.

Figure 11:
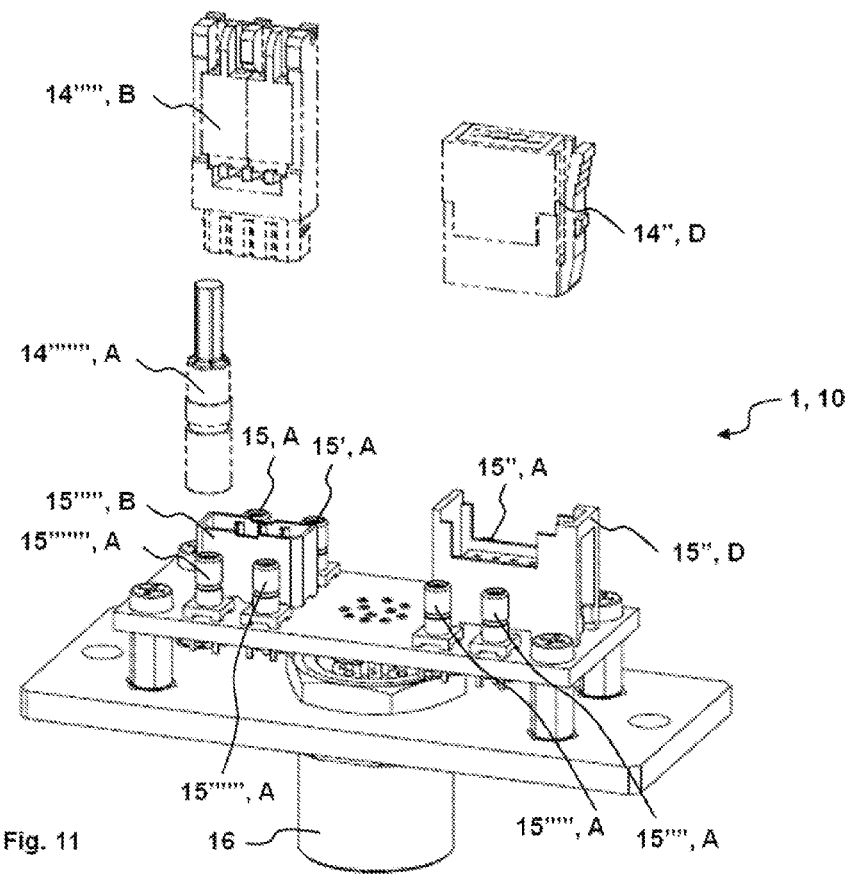
FIG. 11 is a perspective view of a fifth embodiment of a cabling interface according to the invention with three different connection standards.
Figure 12:
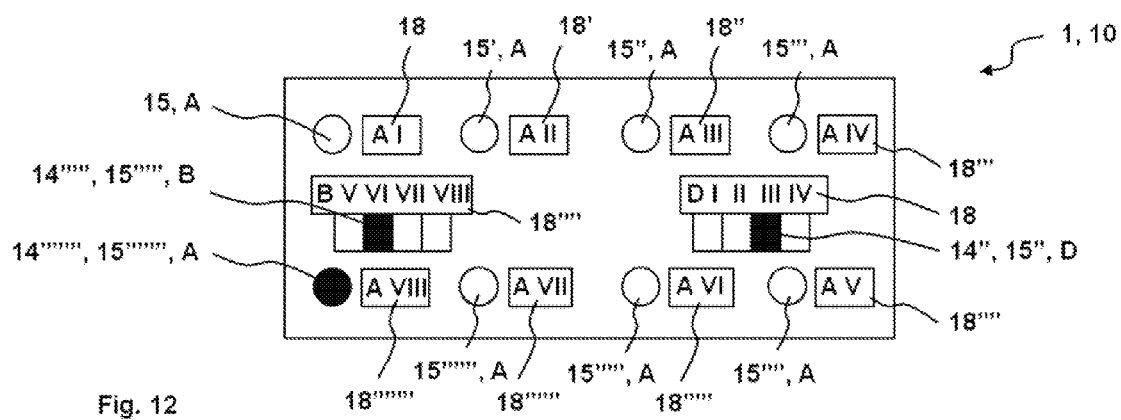
FIG. 12 is a plan view of the fifth embodiment of a cabling interface according to FIG. 11.

In the embodiments of FIGS. 11 and 12, the cabling interface 10 is designed for up to eight electrical connections I-VIII, wherein each electrical connection I-VIII may be implemented in two different connection standards, namely a coaxial socket type connection standard A and a second insulation displacement contact socket type connection D.

Figure 13:
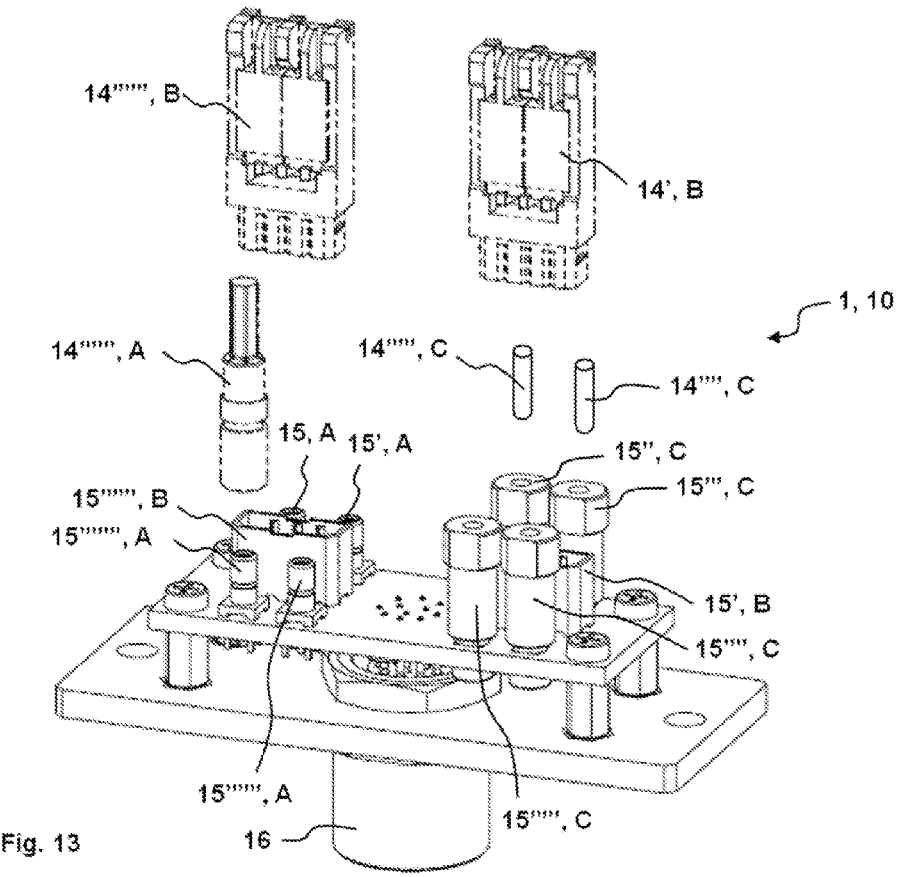
FIG. 13 is a perspective view of a sixth embodiment of a cabling interface according to the invention with three different connection standards.
Figure 14:
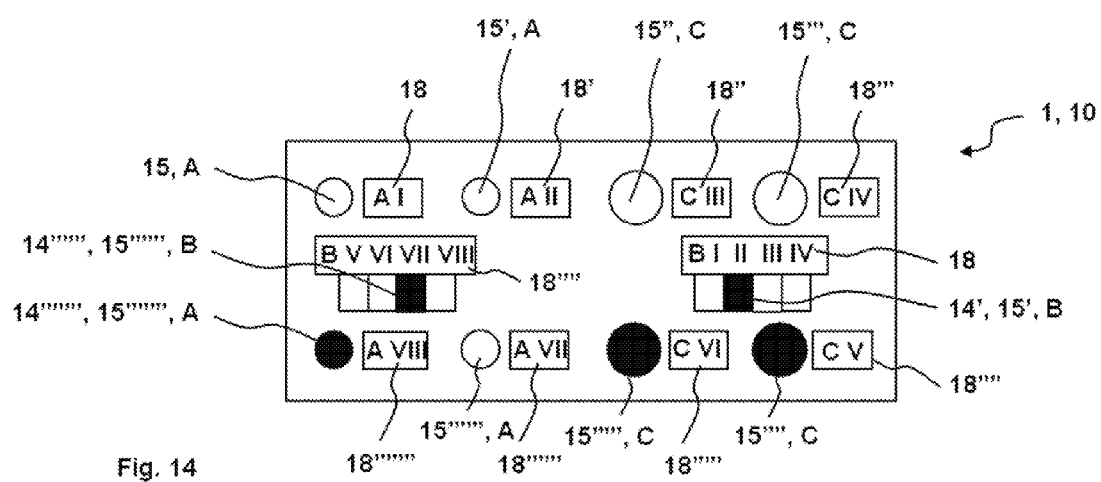
FIG. 14 is a plan view of the sixth embodiment of a cabling interface according to FIG. 13.

In the embodiments of FIGS. 13 and 14, the cabling interface 10 is designed for up to eight electrical connections I-VIII, wherein each electrical connection I-VIII may be implemented in two different connection standards, namely a pierce contact cable socket type connection standard B and either a coaxial type connection standard A or a first (stripped) insulation displacement contact (IDC) socket type connection standard C.

Thus, the cabling interface 10 in accordance with the present invention has a greater number of connection ports 15-15''''''' amongst the inner sockets than the number of electrical connections I-VIII for which the cabling interface 10 is designed. In the embodiments of FIGS. 3, 4, 7 and 8, the inner sockets of the cabling interface 10 are provided with eight connection ports 15-15'''. In the embodiments of FIGS. 9 and 10, the inner sockets of the cabling interface 10 have twelve connection ports 15-15'''. In the embodiments of FIGS. 5, 6, and 11 to 14, the inner sockets of the cabling interface 10 have sixteen connection ports 15-15'''''''.

The cabling interface 10 desirably includes a number of indicators 18-18'''''''. Each of the indicators 18-18''''''' is carried by the frame and arranged on the tool inner side of cabling interface 10. Each indicator 18-18''''''' has a designator. One indicator 18-18''''''' is assigned to each connection port 15-15''''''' of each inner socket, and the electrical connection I-VIII of a connection port 15-15''''''' of an inner socket is identified by the designator of the indicator 18-18''''''' assigned to the connection port of the inner socket. The connection standard A, B, C, D of the connection ports 15-15''''''' of an inner socket is also identified by the designator of the indicator 18-18''''''' assigned to the connection ports 15-15'''''''. In this way, the electrical connection I-VIII and the connection standard A, B, C, D of the connection ports 15-15''''''' are indicated unambiguously by means of the indicators 18-18'''''''. The designator may be a label, a lamp or the like. In FIGS. 4, 6, 8, 10, 12 and 14, the designator is a label such as "A II" in FIG. 4 or "C VI" in FIG. 14. With the knowledge presented in the present invention, the designator may also be a lamp such as a light emitting diode (LED), which LED lights up in one of two different colors, in a first color when an inner cable 14 is mechanically and electrically connected to one of the connection ports of the inner socket to which the LED is assigned and in a second color when an inner cable is not mechanically and electrically connected to any of the connection ports of the inner socket to which the LED is assigned. The color control of the LED may be assured by a sensor that detects a pressure in an electrical connection between the inner cable 14 and one of the connection ports of the inner socket 15, or it may be assured by a switch which switches when an electrical connection is made between an inner cable 14 and one of the connection ports of an inner socket 15.

For example, in the embodiment of FIGS. 3 and 4, two connection ports 15' are present with different connection standards A, B for an electrical connection II. As schematically shown in FIG. 4, an inner cable 14' is connected electrically to one connection port 15' via the second connection standard a A solid black connection port 15' of the connection standard B in FIG. 4 schematically indicates that the inner cable 14' is clearly connected mechanically and electrically to one of the connection ports 15' of the socket of the cabling interface 10. This electrical connection II via connection standard B is marked unmistakably with a designator having label "B II" of indicator 18. Indicator 18 of the connection port 15', with which inner cable 14' is electrically connected, thus showing that an electrical connection II has been made for this connection standard B, and how this electrical connection II is identified. And indicator 18 of the at least one other connection port 15', which is not electrically connected to inner cable 14' shows that an electrical connection I has not been made for this connection standard A by the designator with label "A II". In this way, the clear visibility of inner cable 14' in the connection port 15' of electrical connection II avoids the risk that a further inner cable 14-14'''''' might be connected electrically with the other connection port 15 of electrical connection II via first connection standard A.

Maintenance of production machine 1 is made easier by the cabling interface 10 according to the invention because a defective piezoelectric pressure transducer 13, 13', 13" may be replaced with an available piezoelectric pressure transducer 13, 13', 13" whose inner cable 14-14'''''' has a different connection standard A, B, C, D than that of the inner cable 14-14'''''' of the defective piezoelectric pressure transducer 13, 13', 13" which is to be replaced. In a step a), the existing piezoelectric pressure transducer 13, 13', 13" that is adapted to a first connection standard is removed from the production machine 1. In a subsequent step b), a new piezoelectric pressure transducer 13, 13', 13" that is adapted to a connection standard different from the first connection standard is installed in production machine 1. The new piezoelectric pressure transducer might be chosen because it is available at an advantageous cost or because it provides some other desirable functional advantage over the pre-existing piezoelectric pressure transducer that has been removed. Moreover, the new transducer replaces the pre-existing piezoelectric pressure transducer 13, 13', 13" even though the inner cable 14-14'''''' thereof has one of the different connection standards A, B, C, D of cabling interface 10. In particular, in the replacement step b), the electrical connection I-VIII is made between the inner cable 14-14'''''' of the new piezoelectric pressure transducer 13, 13', 13" and one of at least two connection ports 15-15''''''', which connection ports 15-15''''''' have different connection standards A, B, C, D for electrical connections I-VIII. Electrical connection I-VIII of the inner cable 14-14'''''' is made with whichever one of the connection ports 15-15''''''' has the same connection standard A, B, C, D as the inner cable 14-14''''''.

As schematically shown in FIGS. 1, 3, 5, 7, 9, 11 and 13 for example, the cabling interface 10 desirably is provided with an outer socket 16. The outer socket 16 is arranged on an outer side of the frame of the cabling interface 10 of a tool. The outer socket 16 includes electrical conductors for conducting the electrical charge signals away from the cabling interface 10. The number of electrical conductors in the outer socket 16 desirably is at least equal to the number of electrical connections I-VIII of the cabling interface 10. Accordingly, the outer socket 16 has at least four to eight electrical conductors.

As shown in FIG. 1 for example, an electrically shielded outer cable 17 may be electrically connected to the outer socket 16 in reversibly detachable manner. The outer cable 17 conducts the electrical charge signals away to an evaluation unit 20. Such an outer socket 16 is marketed commercially by the Kistler Group with type designation 1710B. Such an outer cable 17 is marketed commercially by the Kistler Group with type designations 1995A . . . , 1997A . . . , 1999A. Such an evaluation unit 20 is marketed commercially by the Kistler Group with the name CoMo Injection System and type designation 2869B, and details are provided in a datasheet 2869B_000-549.

The cabling interface 10 is equipped with electrical conductors which connect the electrical conductors of the connection ports 15-15'"'' electrically with the electrical conductors of the outer socket 16. As noted above, the electrical conductors of the connection ports 15-15'"'' that have different connection standards A, B, C, D for an electrical connection I-VIII are connected in a parallel circuit relationship. These parallel connected electrical conductors of the connection ports 15-15'"'' of each of the inner sockets are connected electrically to an electrical conductor for the respective electrical connection I-VIII of the respective outer socket 16. For example, in the embodiment of FIGS. 3 and 4, two connection ports 15' with different connection standards A, B are present for an electrical connection II. The electrical conductors of these connection ports 15' are connected in parallel on the cabling interface 10 and connected electrically in a parallel circuit relationship with an electrical conductor of the outer socket 16 for electrical connection II.

FIG. 2 shows a flowchart with steps c), d), e) of a method for retooling a production machine 1 that has an existing cabling interface 0. In a step c), a new inventive cabling interface 10 is provided, which is electrically connectable to the inner cables 14-14'"'' via at least two different connection standards A, B, C, D, as described above. In a step d), the existing cabling interface 0 is removed from production machine 1. In a step e), the new cabling interface 10 is installed in the production machine 1. The newly installed cabling interface 10 is electrically connected to the inner cables 14-14'"''. In step e), an electrical connection I-VIII is made between an inner cable 14-14'"'' and one of at least two connection ports 15-15'"'' of the inner sockets on the installed cabling interface 10, which connection ports 15-15'"'' have different connection standards A, B, C, D for the electrical connection I-VIII. Also in step e), indicator 18-18'"'' of the connection ports 15-15'"'' with which inner cable 14-14'"'' is electrically connected indicates that an electrical connection I-VIII has been made for this connection standard A, B, C, D and how this electrical connection I-VIII is identified. And indicator 18-18'"'' of the at least one other connection port 15-15'"'' which is not electrically connected to inner cable 14-14'"'' shows that an electrical connection I-VIII has not been made for this connection standard A, B, C, D. Inner cables 14-14'"'' of piezoelectric pressure transducers 13, 13', 13" are connectable to a new evaluation unit 20 via the cabling interface 10.

With the knowledge disclosed by the present invention, a person skilled in the art is also able to use the cabling device in production machines outside of the plastics processing industry.

LIST OF REFERENCE SIGNS a)-e) Method steps
A, B, C, D Connection standard
I-VIII Electrical connection
1 Production machine
0 Existing cabling interface
10 Cabling interface
11, 11', 11" Cavity
12, 12', 12" Runner
13, 13', 13" Piezoelectric pressure transducer
14-14'"'' Inner cable
15-15'"'' Connection ports of the Inner sockets
16 Outer socket
17 Outer cable
18-1840'"'' Indicator
20 Evaluation unit

What is claimed is:

1. A cabling interface for a production machine in the plastics processing industry, which production machine includes multiple cavities and multiple piezoelectric pressure transducers, wherein at least a respective one of the multiple piezoelectric pressure transducers is arranged at a respective one of the multiple cavities, wherein each of the respective piezoelectric pressure transducers arranged in the respective cavity captures an internal tool pressure inside the respective cavity and returns an electrical charge signal for each internal tool pressure detected and conducts the electrical charge signal away to the cabling interface via an inner cable, the cabling interface comprising:
 a frame defining an inner side and an outer side disposed opposed to and facing away from the inner side;
 at least one inner socket carried on the inner side of the frame and that includes at least two connection ports electrically connected together in a first parallel circuit relationship, each of the two connection ports being configured according to a different connection standard; and
 at least one outer socket carried on the outer side of the frame and that is paired with and electrically connected together in a second parallel circuit relationship to the at least one inner socket.

2. The cabling according to claim 1, further comprising:
 a second inner socket inner socket carried on the inner face of the frame, the second inner socket including at least two respective connection ports that are electrically connected together in a respective parallel circuit relationship and configured according to a different electrical connection standard; and
 a second outer socket carried on the outer face of the frame, the second outer socket being paired with and electrically connected together in a second respective parallel circuit relationship with the second inner socket.

3. The cabling interface according to claim 1, further comprising:
 at least a first indicator carried by the frame and that physically identifies both the connection standard and the paired output socket of at least one of the connection ports of at least one inner socket; and
 at least a second indicator carried by the frame and that physically identifies both the connection standard and the paired output socket of at least a second one of the connection ports of the at least one inner socket.

4. The cabling interface according to claim 3, wherein at least one of the first and second indicators is configured to display when an inner cable is electrically connected to the connection port identified by the respective first and second indicator.

5. The cabling interface according to claim 3, wherein at least one of the indicators is configured to display when an inner cable is not electrically connected to the connection port identified by the indicator.

6. The cabling interface according to claim 1, wherein the different connection standards are selected from the following group of connection standards: manually detachable coaxial, manually detachable pierce contact, a stripped single-wire insulation displacement contact and a crimped single-wire insulation displacement contact.

7. A production machine in the plastics processing industry, comprising:
- a body that defines a plurality of cavities;
- a plurality of piezoelectric pressure transducers, wherein a first one of the plurality of piezoelectric pressure transducers is arranged at a respective first one of the plurality of cavities, which respective first one of the plurality of piezoelectric pressure transducers is configured for capturing an internal tool pressure inside the respective first one of the plurality of cavities and returning a respective electrical charge signal for each internal tool pressure detected;
- a plurality inner cables, wherein a respective first one of the plurality of inner cables is connected electrically to the first one of the plurality of piezoelectric pressure transducers and configured for conducting away a respective electrical charge signal from the respective first one of the plurality of piezoelectric pressure transducers; and
- a cabling interface connected electrically to the plurality of inner cables via at least two different connection standards.

8. The production machine according to claim 7, further comprising:
- a plurality of inner sockets, each of the plurality of inner sockets including at least two connection ports that are connected together electrically in a first parallel circuit relationship and configured according to a different electrical connection standard; and
- a plurality of outer sockets, each respective one of the plurality of outer sockets being paired with and electrically connected in a second parallel circuit relationship with a respective one of the plurality of inner sockets.

9. The production machine according to claim 7, further comprising:
- a first indicator that physically identifies both the connection standard and the paired output socket of at least one of the connection ports of at least one inner socket; and
- a second indicator that physically identifies both the connection standard and the paired output socket of at least a second one of the connection ports of the at least one inner socket.

10. The production machine according to claim 9, wherein the first indicator is configured to display when an inner cable is electrically connected to the connection port identified by the first indicator.

11. The production machine according to claim 9, wherein the first indicator is configured to display when an inner cable is not electrically connected to the connection port identified by the first indicator.

12. The production machine according to claim 7, wherein the two different connection standards are selected from the following group of connection standards: manually detachable coaxial, manually detachable pierce contact, stripped single-wire insulation displacement contact and crimped single-wire insulation displacement contact.

* * * * *

UNITED STATES PATENT AND TRADEMARK OFFICE
CERTIFICATE OF CORRECTION

PATENT NO. : 10,479,011 B2  
APPLICATION NO. : 15/234388  
DATED : November 19, 2019  
INVENTOR(S) : Andri Lehmann Page 1 of 1

It is certified that error appears in the above-identified patent and that said Letters Patent is hereby corrected as shown below:

In the Claims

Column 12, Claim 2, Line 36 currently reads "a second inner socket inner socket carried on the inner" line should read "a second inner socket carried on the inner."

Signed and Sealed this  
Twenty-eighth Day of January, 2020

Andrei Iancu  
*Director of the United States Patent and Trademark Office*